United States Patent
Li et al.

(10) Patent No.: US 8,615,388 B2
(45) Date of Patent: Dec. 24, 2013

(54) INTRA-LANGUAGE STATISTICAL MACHINE TRANSLATION

(75) Inventors: Xiao Li, Bellevue, WA (US);
Yun-Cheng Ju, Bellevue, WA (US);
Geoffrey Zweig, Sammamish, WA (US);
Alex Aero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1423 days.

(21) Appl. No.: 12/058,328

(22) Filed: Mar. 28, 2008

(65) Prior Publication Data

US 2009/0248422 A1    Oct. 1, 2009

(51) Int. Cl.
*G06F 17/28* (2006.01)

(52) U.S. Cl.
USPC .............................................. 704/2

(58) Field of Classification Search
USPC ........................................ 704/2, 5
See application file for complete search history.

(56) References Cited

U.S. PATENT DOCUMENTS

| | | | |
|---|---|---|---|
| 5,991,710 A | 11/1999 | Papineni et al. | |
| 6,502,064 B1 * | 12/2002 | Miyahira et al. | 704/7 |
| 6,721,728 B2 * | 4/2004 | McGreevy | 1/1 |
| 6,985,861 B2 | 1/2006 | Van | |
| 6,999,932 B1 | 2/2006 | Zhou | |
| 7,027,987 B1 | 4/2006 | Franz | |
| 7,177,814 B2 | 2/2007 | Gong | |
| 7,251,600 B2 | 7/2007 | Ju | |
| 2003/0004716 A1 * | 1/2003 | Haigh et al. | 704/238 |
| 2004/0044952 A1 | 3/2004 | Jiang | |
| 2005/0228640 A1 * | 10/2005 | Aue et al. | 704/9 |
| 2006/0036438 A1 | 2/2006 | Chang | |
| 2006/0095248 A1 * | 5/2006 | Menezes et al. | 704/3 |
| 2006/0142994 A1 * | 6/2006 | Zhou | 704/9 |
| 2006/0143007 A1 | 6/2006 | Koh | |
| 2006/0217963 A1 | 9/2006 | Masuichi et al. | |
| 2007/0005570 A1 | 1/2007 | Hurst-Hiller | |
| 2007/0061335 A1 | 3/2007 | Ramer | |
| 2007/0083359 A1 | 4/2007 | Bender | |
| 2007/0118351 A1 * | 5/2007 | Sumita | 704/2 |
| 2007/0219798 A1 | 9/2007 | Wang | |
| 2007/0250306 A1 * | 10/2007 | Marcu et al. | 704/9 |
| 2008/0086298 A1 * | 4/2008 | Anismovich et al. | 704/5 |

(Continued)

FOREIGN PATENT DOCUMENTS

EP    1217534 A2    6/2002

OTHER PUBLICATIONS

"International Search Report", Filed Date Feb. 27, 2009, Application No. PCT/US2009/035389, pp. 1-12.

(Continued)

*Primary Examiner* — Jakieda Jackson

(57) ABSTRACT

Training data may be provided, the training data including pairs of source phrases and target phrases. The pairs may be used to train an intra-language statistical machine translation model, where the intra-language statistical machine translation model, when given an input phrase of text in the human language, can compute probabilities of semantic equivalence of the input phrase to possible translations of the input phrase in the human language. The statistical machine translation model may be used to translate between queries and listings. The queries may be text strings in the human language submitted to a search engine. The listing strings may be text strings of formal names of real world entities that are to be searched by the search engine to find matches for the query strings.

19 Claims, 3 Drawing Sheets

(56) References Cited

U.S. PATENT DOCUMENTS

| | | | |
|---|---|---|---|
| 2008/0262826 A1* | 10/2008 | Pacull | 704/3 |
| 2008/0319962 A1* | 12/2008 | Riezler et al. | 707/4 |
| 2011/0055192 A1* | 3/2011 | Tang et al. | 707/706 |

OTHER PUBLICATIONS

Live Thesaurus Construction for Interactive Voice-based Web Search Authors: Shui-Lung Chuang, et al. PUblished: Oct. 16, 2000.

Automated Directory Assistance System—from Theory to Practice Authors: Dong Yu, et al. Date Published: Aug. 27, 2007.

Business Listings in Automatic Directory Assistance http://lands.let.ru.nl/literature/odettes.2001.1.pdf Authors: Odette Scharenborg, et al. Date Published 2001.

Language Modeling for Voicesearch: A Machine Translation Approach Authors: Xiao Li, et al. Date Published Oct. 16, 2000.

The Talp Ngram-Based Smt System for Iwslt' 05 Authors: Josep M. Crego, et al. Date Published: Oct. 24, 2005.

Learning of User Formulations for Business Listings in Automatic Directory Assistance Authors: Popovici C et al: Date Published: Sep. 3, 2001.

Stefan Riezler et al: "Statistical Machine Translation for Query Expansion in Answer Retrieval", ALC 2007 Proceedings [Online] Jun. 23, 2007.

Quirk C et al: "Monolingual Machine Translation for Paraphrase Generation" Proceedings of the Conference on Empirical Methods in Natural Language Processing, XXXX, Jul. 25, 2004.

Xiao Li, Y.-C. Ju, Geoffrey Zweig, and Alex Acero: "Language Modeling for Voice Search: A Machine Translation Approach", In Proceedings of ICASSP 2008, Mar. 31, 2008-Apr. 4, 2008.

P. Natarajan, R. Prasad, R. Schwartz, and J. Makhoul, "A Scalable Architecture for Directory Assistance Automation," in Proc. ICASSP, Orlando, U.S., 2002.

D. Yu, Y.-C. Ju, Y.-Y. Wang, G. Zweig, and A. Acero, "Automated Directory Assistance System—from Theory to Practice," in Proc. Interspeech, Antwerp, Belgium, 2007.

O. Scharenborg, J. Sturm, and L. Boves, "Business Listings in Automatic Directory Assistance," in Proc. Eurospeech, Aalborg, Denmark, 2001.

Zweig et. al., "The Voice-Rate Dialog System for Consumer Ratings," in Proc. Interspeech, Antwerp, Belgium, 2007.

A. Berger and J. Lafferty, "Information Retrieval as Statistical Translation," in Proc. SIGIR, 1999.

J. M. Crego, A. De Gispert, and J. B. Marino, "The Talp Ngram-Based Smt System for Iwslt'05," in Proc. International Workshop Spoken Language Translation, Pittsburgh, 2005.

M. Bisani and H. Ney, "Investigations on Joint Multigram Models for Grapheme-to-Phoneme Conversion," in Proc. ICSLP, Denver, U.S., 2002.

X. Li, A. Gunawardana, and A. Acero, "Adapting Graphemeto-Phoneme Conversion for Name Recognition," in Proc. ASRU, Kyoto, Japan, 2007.

Adam L. Berger, S. Della Pietra, and V. J. Della Pietra, "A Maximum Entropy Approach to Natural Language Processing," Computational Linguistics, vol. 22, No. 1, 1996.

G. Salton and C. Buckley, "Term-Weighting Approaches in Automatic Text Retrieval," Information Processing & Management, vol. 24, No. 5, 1988.

D. Miller, "Speech-Enabled Mobile Search Marches On," Speech Technology Magazine, Jul. 2007.

Using inter-lingual triggers for machine translation, Caroline Lavecchia et al., 8th Annual Conference of the International Speech Communication Association, Belgium, Aug. 27-31, 2007.

\* cited by examiner

INTRA-LANGUAGE STATISTICAL MACHINE TRANSLATION

BACKGROUND

Network based search services, Internet search engines, voice search, local search, and various other technologies for searching and retrieving information have become increasingly important for helping people find information. Voice search involves a coupling of voice recognition and information retrieval. An uttered phrase is automatically recognized as text, and the text is submitted as a query to a search service. For example, a person may use a mobile phone equipped with a voice search application to find a restaurant by speaking the name of the restaurant into the mobile device, and the mobile device may recognize the spoken restaurant name (i.e., convert it to text) and transmit the text of the restaurant name to a remote search service such as a business directory. Local search is a special case of search where listings of business establishments, firms, organizations, or other entities have been used to enable mobile devices to search same. Consider the following example.

A user may be interested in finding information about a business listed in a directory as "Kung Ho Cuisine of China". However, the user formulates a query as "Kung Ho Restaurant". Currently, a search for this listing will not take advantage of statistical parallels between parts of the query and listing forms. Furthermore, erroneous listings, e.g. "Kung Ho Grocery" may be returned as a relevant match.

Discussed below are techniques related to statistical intra-language machine translation, and applications thereof to speech recognition, search, and other technologies.

SUMMARY

The following summary is included only to introduce some concepts discussed in the Detailed Description below. This summary is not comprehensive and is not intended to delineate the scope of the claimed subject matter, which is set forth by the claims presented at the end.

Training data may be provided. The training data may include pairs of source phrases and target phrases. The pairs may be used to train an intra-language statistical machine translation model, where the intra-language statistical machine translation model, when given an input phrase of text in the human language, can compute probabilities of semantic equivalence of the input phrase to possible translations of the input phrase in the human language. The statistical machine translation model may be used to translate between queries and listings. The queries may be text strings in the human language submitted to a search engine. The listing strings may be text strings of formal names of real world entities that are to be searched by the search engine to find matches for the query strings.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

The description below covers embodiments related to using a statistical machine translation model to translate between sentences or phrases of a same human language. The description begins with discussion of how a relatively small set of training sentences or phrases are used to train a statistical translation model. Applications of the intra-language machine translation model are then described, including applications to search, automatic speech recognition (ASR), and display of speech recognition results Intralanguage Statistical Machine Translation Model Statistical models have been used to translate sentences from one language to another language. However, they have not been trained or used for translating between phrases or sentences of a same language. That is, statistical modeling has not previously been used to translate phrases in English, for example, to other semantically similar phrases also in English.

A statistical translation model is a generalization of some sample of text, which may be parallel phrases such as a query strings and corresponding directory listings. Some types of statistical translation models give probabilities that a target sentence or phrase is a translation of a source sentence or phrase, and the probabilities reflect the statistical patterns derived from the training text. In effect, the model is a probabilistic generalization of characteristics or trends reflected from statistical measurements of training sentences. Note that throughout this description, the terms "sentence" and "phrase" will be used interchangeably to refer to relatively short arrangements of words. Formal and informal names of businesses, query strings inputted by users, grammatical sentences, clauses, and the like are examples of sentences or phrases. Note also that while this description discusses intra-language statistical machine translation as applied to phrase-based search (in particular voice and/or geographically localized search), the concepts are not limited to search applications. Furthermore, searching listings of short phrases is also applicable to other types of search besides local search, including product search, job search, etc.

Figure 1:
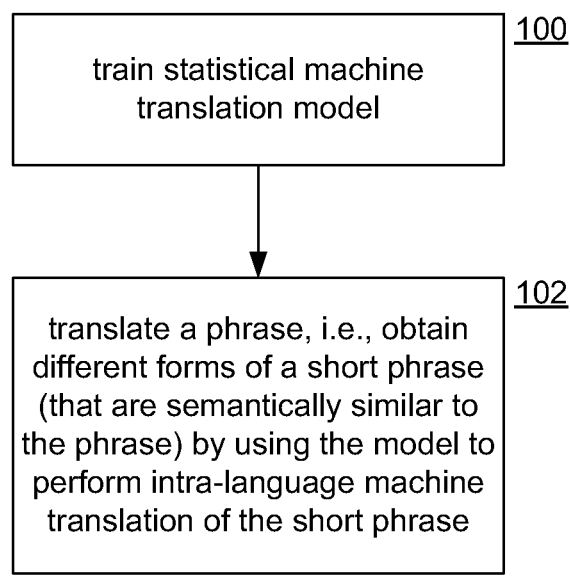
FIG. 1 shows a general process for intra-language statistical machine translation.

FIG. 1 shows a general process for intra-language statistical machine translation. Initially, a statistical machine translation model is trained 100. Training 100 will be described in detail later. The training 100 is performed using a sample of training data, which may come from a variety of sources. The training data will include parallel (paired) phrases in a same human language. The training 100 informs the translation model with statistics (e.g., n-grams) that can be used to compute probabilities or likelihoods of candidate translations of a phrase. Specific training 100 for an n-gram based model will be described below.

After the model is trained 100, the model is used to translate 102 a source phrase into a target phrase. Translation 102 involves starting with a source phrase and obtaining a semantically similar or equivalent target phrase. For example, a source phrase "Kung Ho Cuisine of China" might be translated to a target phrase "Kung Ho Chinese Restaurant" or "Kung Ho Restaurant" Different forms of candidate target phrases are obtained. The statistical translation model is used to find one or more of the most probable candidate target phrases. Consider the following overview of voice based search and how it relates to intra-language machine translation.

A voice search system may involve two components: a voice recognition component and an information retrieval (search) component. A spoken utterance o is converted into a text query q using automatic speech recognition (ASR), i.e., $$q^* = \text{argmax}_q p(o|q) p(q) \qquad (1)$$

where p(o|q) and p(q) represent an acoustic model and a language model (LM), respectively. Statistical LMs, e.g. n-gram models, are often used to allow flexibility in what users can say. That is, they allow a variety of sayings to be recognized by the ASR component. Next, the best (or n-best) q is passed to a search engine to retrieve the most relevant document d, i.e.

$$d^* = \text{argmax}_d p(d|q) \qquad (2)$$

In the context of local search, documents d may be in the form of business listings (names of business, organizations, or other entities), which are typically short, e.g. "Kung Ho Cuisine of China".

Given this framework for voice based search, listings and queries, because they are both relatively short, are treated as pairs akin to "sentence pairs" found in bilingual translation training. A bilingual statistical translation model, adapted for intra-language translation, may be used to automatically convert the original form of a listing to its query forms (i.e., the forms that a user might be expected to input when searching for the listing), which in turn may be used for building more robust LMs for voice search, grammar checking, or other applications. Conveniently, the statistical translation model may be trained using a small number of transcribed or artificially produced queries, without necessarily having to acquire matching listings. While a variety of types of statistical models can be used for machine translation, an n-gram based model will be described next.

Although a query phrase and its intended listing phrase may differ in form, there is usually a semantic correspondence, at the word level, between the two phrases. In other words, words in the query can be mapped to words in the listing or to a null word, and vice versa. A machine translation approach may be used to predict possible query forms of a listing, and then to utilize the predicted query forms to improve language modeling. Specifically, as discussed next, n-grams may be used on word pairs to model the joint (conditional) probability of a listing and a query.

Figure 2:
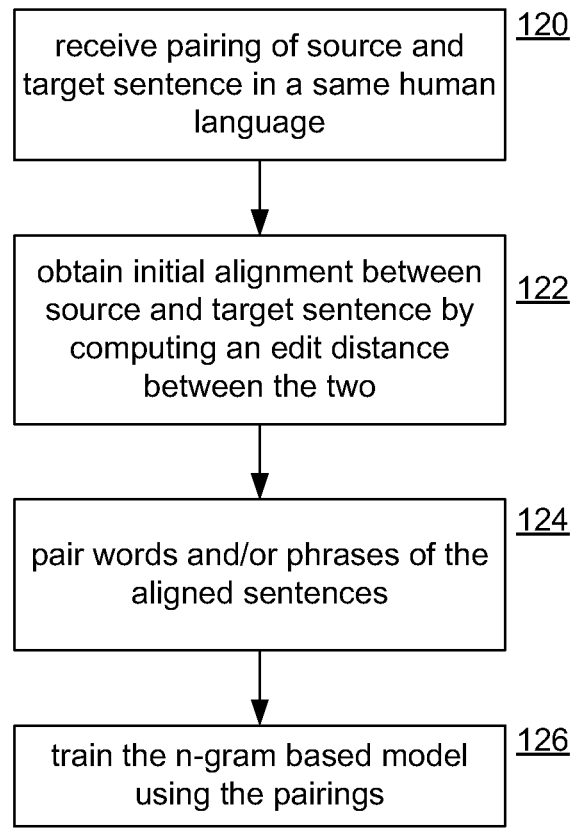
FIG. 2 shows a process for building an n-gram based model.

FIG. 2 shows a process for building an n-gram based model. A pair of source and target sentences in a same human language are received 120. An alignment between the source and target sentences is obtained 122 by computing an edit distance between the two sentences. Words and/or phrases of the aligned sentences are then paired 124 and treated as semantic units. Pairings may be formed by finding semantically/literally similar/equivalent words or phrases. The pairings are then used to train 126 an n-gram model. The steps of this process may be repeated for different source and target sentences. While a small set of training sentences may suffice for some applications, using more training data will create a more robust model. Note also that the alignment and the n-gram model may be iteratively updated and refined in the maximum likelihood sense.

Details of generating an n-gram based model will now be described. For training 100 an n-gram based model, initial training data is provided. This data may be a body of parallel text (d, q), where listings d and queries q serve as source and target sentences respectively. The sentences d and q may be monotonically aligned, where null words are added, if necessary, to account for insertions or deletions that occur in the alignment. The monotonic alignment will be denoted as a. Note that in another embodiment, a non-monotonic alignment may be used.

Once aligned, a sequence pairs of words from d and q is generated, which is denoted as (d, q, a)=((d$_1$, q$_1$), (d$_2$, q$_2$), . . . , (d$_L$, q$_L$)), where each (d$_i$, q$_i$) is treated as a single semantic unit. Consecutive word pairs can be merged to form phrase pairs if necessary.

The sequence of word pairs can then be used to train an n-gram model. Consequently, the probability of an aligned sentence pair is computed as $$(d, q, a) = \prod_i^{p_M} p((d_i, q_i) | (d_{i-n+1}, q_{i-n+1}), \ldots, (d_{i-1}, q_{i-1})) \qquad (3)$$

where M denotes the monotonic condition. Note that the initial alignment a may be computed using the Levenshtein distance between d and q. The alignment and the n-gram model's parameters may be updated in the maximum likelihood sense. Re-alignment can be based on pairing frequencies, for example.

Given the trained n-gram model, a listing-to-query translation may be performed. Given a listing form d, and given query forms q (from a decoder, discussed later), the query forms are searched to find those that have the highest conditional probability:

$$q^* \approx \max_q \max_a p_M(d, q, a) \qquad (4)$$

where p(d, q, a) is evaluated using equation (3).

The translation not only exploits word-level semantic correspondence as modeled by unigrams, but it also takes into account word context by using higher order n-grams. The search for the best or n-best query forms can be achieved efficiently by applying the best-first search algorithm, which is described by Russell and Norvig in *Artificial Intelligence: A Modern Approach* (Prentice Hall, second edition, 2003). Using this type of search, pruning techniques may be applied to reduce computational complexity. Returning to the language model (LM) for speech recognition, once the n-best query forms are obtained for the listings, they may be used as training sentences for LM estimation.

There are two implementation details to be considered. First, allowing the use of null words in d raises a potential problem at decode time—the search space is significantly expanded because null can be present or absent at any position of the source sentence. To avoid this problem, it is preferable to eliminate the use of (d$_i$=null, q$_i$) as semantic units for values of q$_i$. Specifically, in training, (d$_i$=null, q$_i$) may be merged with its proceeding or following semantic unit, depending on which of the phrases, q$_{i-1}$q$_i$ or q$_i$q$_{i+1}$, have more occurrences in the training data. Then, (d$_{i+1}$, q$_{i-1}$q$_i$) or (d$_{i+1}$, q$_i$q$_{i-1}$) may be treated as a single semantic unit. At decode time, null is not explicitly inserted in d, because using semantic units (d$_{i-1}$, q$_{i-1}$q$_i$) or (d$_{i+1}$, q$_i$q$_{i+1}$) is equivalent to adding null in the source sentence.

The second implementation detail concerns out-of-vocabulary (OOV) words in d. When OOV occurs, it might not be possible to produce any query forms, since p(d$_i$=OOV, q$_i$)=0 for any value of q$_i$. To deal with such cases, a positive probability may be assigned to unigrams (d$_i$, q$_i$=d$_i$) whenever d$_i$=OOV. This implies that a listing word, if never seen in the training data, will be translated to itself.

It should be noted that embodiments with non-monotonic alignment are also possible. Furthermore, a re-ordering strategy may be used. This may be implemented before a monotonic alignment is applied by reordering d while keeping the order of q. When training the translation model, the best way to reorder the words in the source form is determined by computing the resulting joint n-gram model likelihood. Only orders that are shifts of the original order are considered, and a maximum entropy classifier for these orders is built, where the input of the classifier is the source form, and the output is an order. Prior to translation, this classifier is applied to reorder a source form.

Applications of Intralanguage Statistical Translation Model

Figure 3:
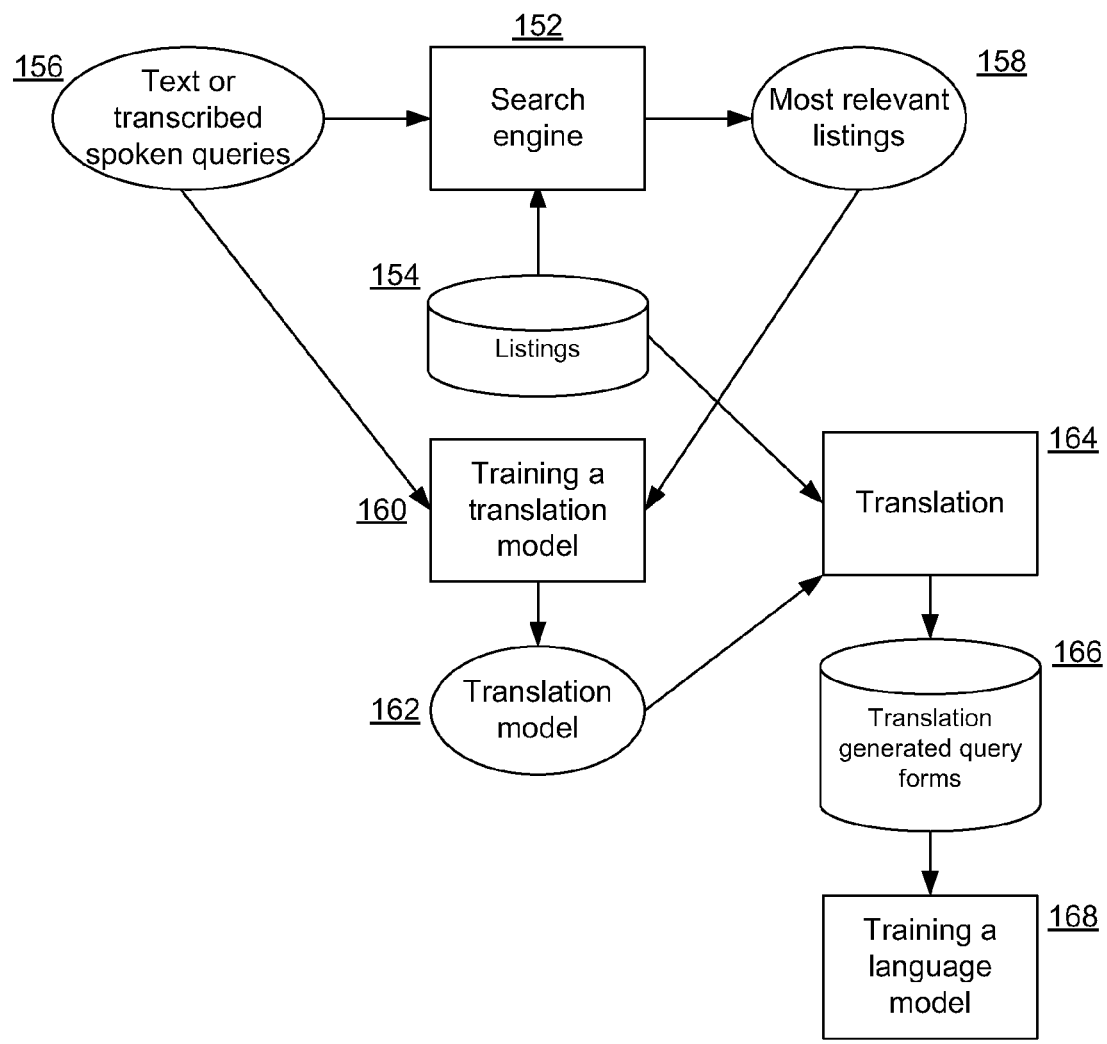
FIG. 3 shows an arrangement for using a statistical translation model to improve a search system and/or the language model of a voice recognition system.

FIG. 3 shows an arrangement for using a statistical translation model to improve a search system and/or the language model of a voice recognition system. A search engine 152 is configured to search listings 154, for example business listings. The search engine 152 receives text queries or transcribed spoken queries 156 that are generated by users and submitted to the search engine 152. Corresponding relevant listings 158 are retrieved by the search engine 152. Note that training pairs can also be obtained algorithmically using TF-IDF (term frequency-inverse document frequency).

The text or transcribed queries 156 and corresponding search-engine retrieved listings 158 are passed to a training component 160 that trains a statistical translation model 162, which may be n-gram based or another type of model. As discussed above, the training component 160 iterates through source-target pairs of the transcribed queries 156 and listings 158. In the case of an n-gram based model, given a (source, target) pair, an initial monotonic alignment is obtained between the source form and target form by computing an edit distance. Given the alignment, the training component 160 discovers word-level pairs and builds an n-gram translation model 162 based on the word-level pairs. The alignment and n-gram model parameters of the translation model 162 may be iteratively refined to improve the translation model 162. Furthermore, training may implement a backoff strategy which assumes that a word can be translated to itself, as is possible with intra-language translation. In other words, the aligned units WORD-WORD, where WORD can be a word or a phrase, will have a positive probability.

A translation module 164 uses the translation model 162 to test decoded candidates (potential translations). Given the trained translation model 162 and a source form, a best-first search algorithm may be used to obtain the top n-best target forms (the n decoded target forms with the highest probability according to the translation model 162). The weight of each target form is determined by p(target|source) produced by the translation model. Unlikely word-level pairs may be pruned to speed up translation.

Given the translation model 162 and the translation module 164, subsequent searches may be improved as follows. Given a user's query q and a listing d found by the search engine 152, translated query forms x of the listing d are considered when measuring the listing d's relevancy to a user's query. Letting $s(\_,\_)$ be a function or measure of relevancy (or similarity), the measurement of relevancy may be $s(q, d)=\text{sum}\_x\{p(x|d) s(q, x)\}$. Alternatively, relevancy may be measured directly from the translation probability, in which case $s(q, d)=p(q,d)$. In one embodiment, potential translations can be filtered out if their similarity measure is below a specified threshold.

Furthermore, not only may searching be improved as described above, but a language model 168 can also be built or augmented using intra-language translation. Language models are used in many natural language processing applications such as ASR, machine translation, and parsing. The intra-language translation provided by the translation model 162 and translation module 164 may be used in language modeling by translating listings into query forms and using the same-language translated query forms when estimating a language model 168. When estimating the language model 168, the count of a translated query form may be set to its posterior probabilities multiplied by the count of its original listing.

In one embodiment, a server- or client-based voice recognizer may be provided with the language model 168, which will allow the voice recognizer to perform more accurate and comprehensive speech recognition with respect to utterances directed to the listings 154 or to listings. The translation model 162 may also be used at a server or at a mobile client to translate a string inputted at the mobile device (whether by ASR or otherwise) to a display form.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on. The modules, components, processes, and search engine 152 discussed above may by realized on one computing device or multiple cooperating computing devices.

The invention claimed is:

1. A computer implemented method for intra-language machine translation of phrases in a human language, the method performed by one or more computers comprised of one or more processors and memory, the method comprising:

receiving training data, the training data comprising a list of text queries in the human language submitted to a search engine and a list of text sentences in the human language returned by the search engine when the text queries were submitted to the search engine, and forming pairings of source phrases and target phrases by comparing the text queries and the text sentences to identify text queries that are similar to text sentences and pairing the identified text queries, as the source phrases, with the respective identified text sentences, as the target phrases, and storing the training data in the memory;

processing each pairing by the one or more processors, the processing comprising, for a current pairing being processed, parsing the source phrase of the current pairing into source words and parsing the target phrase of the current pairing into target words, and computing an alignment of the source words and the target words;

using, by the one or more processors, the pairs of training data and their respective alignments to train an n-gram based intra-language statistical machine translation model, where the intra-language statistical machine translation model, when given an input phrase of text in the human language, can identify possible translations of the input phrase in the human language and compute probabilities of semantic equivalence of the input phrase to the possible translations of the input phrase in the human language; and using the statistical machine translation model to find translations of queries and use the translations to evaluate listings that match the queries, where the queries comprise text strings in the human language submitted to the search engine, where the listing strings comprise text strings of formal names of real world entities that are found by the search engine as matches for the query strings.

2. A method according to claim 1, wherein the using the intra-language statistical translation model comprises:

receiving from the search engine listings that the search engine matched to a user's query;

generating query forms of one of the listings by using the translation model to translate the one of the listings to the query forms;

using the translation model to compute similarities of the query forms to the user's query, and determining that the listing does not match the user's query based on the computed similarities.

3. A method according to claim 1, wherein the using the intra-language statistical translation model comprises:

receiving from the search engine a listing that the search engine matched to the user's query;

using the model to find a probability that the listing is a translation of the user's query; and determining whether the listing matches the user's query based on the probability.

4. A method according to claim 1, wherein the computing an alignment comprises rearranging either the current source words, the target words, or both, so that semantically equivalent words of the source and target phrases are aligned; and iteratively updating the alignment and parameters of the n-gram based intra-language statistical translation model.

5. A method according to claim 1, further comprising using the intra-language statistical translation model to generate a language model of the human language, the language model being capable of determining a likelihood of strings in the human language.

6. A method according to claim 5, wherein the using the intra-language statistical translation model to generate the language model comprises including with the language model translations from the intra-language statistical translation model.

7. A method according to claim 5, further comprising performing automatic speech recognition with the language model.

8. One or more storage devices storing information to enable a computing device to perform a process for translating phrases of a human language to other phrases of the language, the process comprising:

accessing training pairs comprising pairs of phrases in the human language, the training pairs comprising text queries in the human language submitted to a search engine and corresponding text sentences in the human language returned by the search engine when the text queries were submitted to the search engine, the training pairs formed by comparing the text queries and the text sentences to identify text queries that are similar to text sentences and pairing the identified text queries with the respective identified text sentences;

training a statistical machine translation model with the training pairs by computing respective alignments of the training pairs, an alignment mapping words of a phrase with the words the phrase is paired to by inserting null words into the phrase or reordering words of the phrase, the statistical machine translation model being capable of computing probabilities that a target string in the human language is a valid translation of a given source string in the human language;

receiving a text phrase in the human language, decoding the text phrase to different candidate translations of the text phrase in the human language, and using the statistical machine translation model to compute probabilities that the candidate translations are translations of the text phrase; and based on the probabilities, storing and/or displaying, by computer, one or more of the candidate translations.

9. One or more storage devices according to claim 8, wherein the training pairs comprise query strings submitted by users paired with listings that a search engine matched with the query strings.

10. One or more storage devices according to claim 8, wherein the received text phrase comprises a query string inputted by a user, the query string comprising text in the human language, and the process further comprises using the statistical machine translation model to identify a plurality of probable potential translations of the query string, the potential translations comprising text in the human language.

11. One or more storage devices according to claim 8, wherein the received text phrase comprises a name of an organization or business entity obtained from a search engine for searching listings of business/organization names, the name having been obtained from the search engine according to a user-inputted query, and wherein the process further comprises using the statistical machine translation model to determine a probability that the name is a valid translation of the query string and determining relevancy of the listing to the query based on the probability.

12. One or more storage devices according to claim 8, further comprising using the statistical machine translation model to build a statistical language model of the human language, where the statistical language model provides probabilities of phrases in the human language.

13. One or more storage devices according to claim 8, the process further comprising using the statistical machine translation model to translate text queries recognized by a speech recognizer into display forms.

14. A method performed by one or more computers comprised of one or more processors and physical storage, the method comprising:

providing a statistical machine translation model, stored in the physical storage, and configured to allow the one or more processors to compute probabilities of translations of phrases, wherein the phrases are in a human language and the translations of the phrases are in the same human language, the statistical machine translation model having been trained with training pairs, the training pairs having been computed from a list of text queries in the human language submitted to a search engine and from a list of text sentences in the human language returned by the search engine when the text queries were submitted to the search engine, and by comparing the text queries to the text sentences to identify which of the text queries are similar to which of the text sentences, where text sentences identified as similar to text queries are respectively paired to form the training pairs; and using, by the processor, the statistical machine translation model to translate between query forms and listing forms of organizations and/or businesses, where the query forms comprise phrases, in the human language, submitted to the search engine, and where the listing forms comprise formal names, in the human language, of organizations and/or businesses searchable by the search engine.

15. A method according to claim 14, wherein the using the statistical machine translation model comprises computing similarity between a query form and a listing form.

16. A method according to claim 14, wherein, given a user query inputted by a user in the human language, given a corresponding listing in the human language that was found by the search engine, and given a set of candidate translations of the listing, the candidate translations also in the human language, the using the statistical machine translation model comprises computing probabilities of the candidate translations.

17. A method according to claim 16, further comprising generating a search result for the given user query based on the computed probabilities.

18. A method according to claim 14, further comprising generating or modifying a search result of the search engine based on probabilities computed by the statistical machine translation model, the search result corresponding to a user-inputted query form.

19. A method according to claim 18, further comprising using the probabilities to rank or eliminate search result.

* * * * *